(12) United States Patent
Kim et al.

(10) Patent No.: US 8,636,096 B2
(45) Date of Patent: Jan. 28, 2014

(54) LAUNCHABLE REMOTE-CONTROL ATTACK DEVICE

(75) Inventors: Soohyun Kim, Daejeon (KR);
Kyung-Soo Kim, Daejeon (KR);
Jeehyoung Kim, Seoul (KR); Bong-soo Kang, Daejeon (KR); Wonsuk Jung, Daejeon (KR); Chulyoung Kim, Daejeon (KR); Yunsic Hong, Daejeon (KR); Hyunsoo Park, Daejeon (KR); Kyuje Yoo, Daejeon (KR); Doo-Yeol Koh, Daejeon (KR); Seung-Ho Lee, Daejeon (KR); Min-Gu Lee, Cheonan-si (KR)

(73) Assignees: Korea Advanced Institute of Science and Technology (KR); Duksan Mecasys Inc. (KR)

( * ) Notice: Subject to any disclaimer, the term of this patent is extended or adjusted under 35 U.S.C. 154(b) by 95 days.

(21) Appl. No.: 13/213,291

(22) Filed: Aug. 19, 2011

(65) Prior Publication Data

US 2012/0043149 A1    Feb. 23, 2012

(30) Foreign Application Priority Data

Aug. 19, 2010  (KR) .................. 10-2010-0080550

(51) Int. Cl.
*B25J 9/18* (2006.01)
(52) U.S. Cl.
USPC ........... 180/218; 180/7.1; 180/21; 180/65.51; 180/6.48
(58) Field of Classification Search
USPC .................. 180/218, 7.1, 21, 65.51, 6.48, 6.5
See application file for complete search history.

(56) References Cited

U.S. PATENT DOCUMENTS

| | | | | |
|---|---|---|---|---|
| 4,621,562 | A * | 11/1986 | Carr et al. ................... | 89/41.05 |
| 6,502,657 | B2 * | 1/2003 | Kerrebrock et al. .......... | 180/218 |
| 6,548,982 | B1 * | 4/2003 | Papanikolopoulos et al. ........................ | 318/568.11 |
| 6,860,346 | B2 * | 3/2005 | Burt et al. ...................... | 180/8.2 |
| 7,559,385 | B1 * | 7/2009 | Burt et al. ...................... | 180/65.1 |
| 7,673,710 | B2 * | 3/2010 | Lee et al. ........................ | 180/8.2 |
| 7,974,736 | B2 * | 7/2011 | Morin et al. ................... | 700/245 |
| 8,162,351 | B2 * | 4/2012 | Lee et al. ....................... | 280/755 |

(Continued)

FOREIGN PATENT DOCUMENTS

| | | |
|---|---|---|
| JP | 2008229813 | 10/2008 |
| KR | 19920003026 | 2/1992 |
| KR | 200334955 | 11/2003 |
| KR | 100767013 | 10/2007 |

OTHER PUBLICATIONS

Korean Office Action—Korean Application No. 10-2010-0080550 issud on Jul. 17, 2012, citing JP2008-229813 and KR20-0334955.

*Primary Examiner* — Kevin Hurley
*Assistant Examiner* — Michael Stabley
(74) *Attorney, Agent, or Firm* — Cantor Colburn LLP

(57) ABSTRACT

Provided is a launchable remote-control attack device that enables an operator to remotely grasp the status of a target place and to remotely control weapons it has been equipped with to perform an attack using explosives or gas when necessary. The remote-control attack device includes a cylindrical body with a camera, drivers which are made up of two tires that are disposed on opposite sides of the body and can be driven individually, and battery units for supplying power and which are disposed in central openings of the tires of the drivers. The attack device further includes a plurality of storage units and a wireless control unit.

9 Claims, 7 Drawing Sheets

(56) References Cited

U.S. PATENT DOCUMENTS

| | | | |
|---|---|---|---|
| 8,186,469 B2* | 5/2012 | Yim et al. | 180/218 |
| 2003/0137268 A1* | 7/2003 | Papanikolopoulos et al. | 318/568.11 |
| 2004/0000439 A1* | 1/2004 | Burt et al. | 180/7.1 |
| 2010/0152922 A1* | 6/2010 | Carlson et al. | 701/2 |
| 2010/0243357 A1* | 9/2010 | Yim et al. | 180/218 |
| 2011/0174565 A1* | 7/2011 | Rochat et al. | 180/167 |
| 2012/0185087 A1* | 7/2012 | Kang | 700/245 |

* cited by examiner

LAUNCHABLE REMOTE-CONTROL ATTACK DEVICE

BACKGROUND OF THE INVENTION

1. Field of the Invention

The present invention related to a throwable and launchable remote-control attack device that is used for military purposes or counter-terrorism; and, more particularly, to a launchable remote-control attack device that enables an operator to remotely grasp the status of a location being targeted and to remotely control weapons equipped with it to carry out an explosive or gas attack when necessary.

2. Description of Related Art

With the rapid progress of worldwide urbanization, war has adopted the element of street fighting. Even if a war has not necessarily broken out, a variety of crimes and terrorism take place around us at unexpected times and in unforeseen places. In the event of such incidents, it is essential to grasp the initial situation to take rapid and suitable countermeasures. Frequently, most of the places where the incidents take place do not permit easy access by soldiers, policemen, or rescuers, so that the situation deteriorates or damage is increased.

For this reason, when the chaser of the enemy or offender encounters an unfamiliar building or place with an unfamiliar interior, reconnaissance robots are frequently used to rapidly check the status of the interior. Furthermore, if such a reconnaissance robot that can check the status of the enemy or terrorists when confrontations with them occur can be charged with explosives or attack gas to attack or suppress the enemy or terrorists, the utilizability of the reconnaissance robot in military operations can be markedly increased.

However, the conventional reconnaissance robots that have been used are devices that must be recycled rather than ones that can be disposed of after having been used in a certain military operation. Further, the required functions have diversified and become cerebral, resulting not only in production being expensive but also increasing the size of the robot, resulting in low mobility. Moreover, under conditions where the robots cannot gain access due to a narrow passage or a natural disaster, the use of the robots is retarded.

To solve these problems, throw-type reconnaissance robots that are designed to be thrown by hand or by a throwing machine have recently been developed. These robots overcome the present problems of accessibility or agility. However, these robots can be used in a thrown manner only in an infiltration operation within a maximum 30 meters. Moreover, developing the method of attacking or suppressing the enemy using the reconnaissance robots has been neglected.

SUMMARY OF THE INVENTION

An embodiment of the present invention is directed to providing a remote-control attack device that can be launched by a launcher so that it can rapidly infiltrate into a location being targeted that is far away, and can conduct an active attack task, for example, an attack using explosives or gas, via remote-control depending on post-infiltration conditions.

To achieve the object of the present invention, the present invention provides a remote-control attack device, including: a cylindrical body with a camera; drivers made up of two tires that are disposed on opposite sides of the body and can be driven individually; battery units for supplying power and disposed in central openings of the tires of the drivers; a plurality of storage units; and a wireless control unit.

Preferably, the storage units may comprise a first storage unit provided in the body, and second storage units provided in the respective battery units.

Further, each of the first and second storage units may include a detonator, an explosive and shrapnel.

The shrapnel may comprise steel balls that scatter to enhance killing ability when exploding.

In addition, each of the first storage unit and the second storage units may include a gas reservoir storing gas therein.

Furthermore, a discharge nozzle may be provided on the first storage unit so that gas is discharged from the first storage unit and the second storage units through the discharge nozzle under control of the wireless control unit.

Preferably, each of the first storage unit and the second storage units may have a detonator.

The wireless control unit may be connected to the first storage unit and the second storage unit to control detonation of the explosive or discharge of gas.

The remote-control attack device may comprise a plurality of remote-control attack devices, wherein the cylindrical bodies of the remote-control attack devices may be coupled to each other by a connector.

The connector may have an explosive or a gas reservoir therein.

The remote-control attack device may be contained in a protective casing filled with a protective material.

[Detailed Description of Main Elements]

Figure 1:
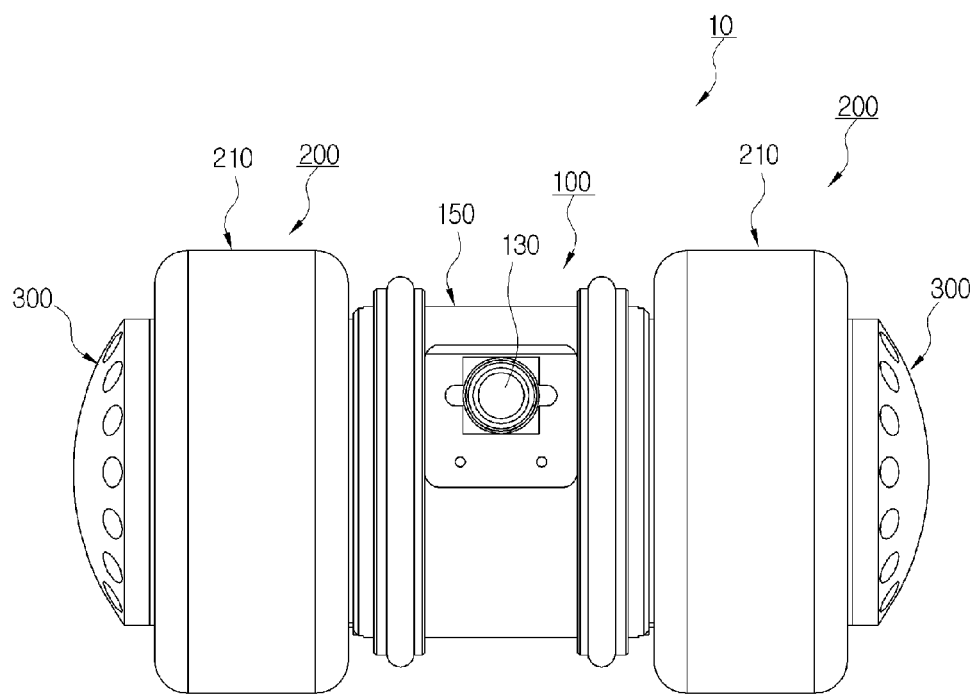
FIG. 1 is a front view of a remote-control attack device in accordance with the present invention.
Figure 2:
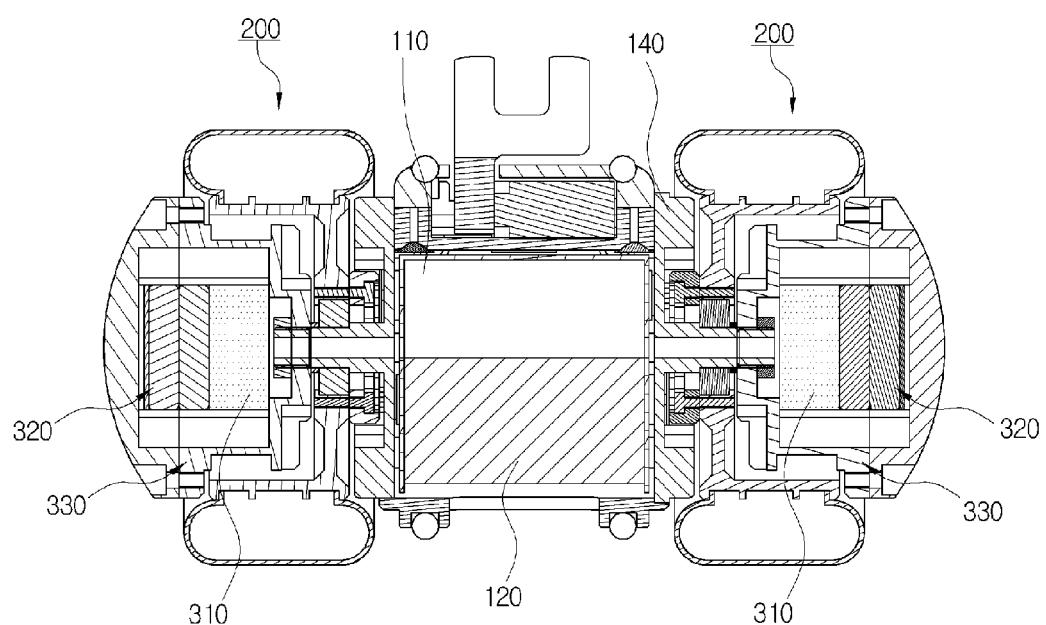
FIG. 2 is a sectional front view of the remote-controller attack device in accordance with the present invention.

| | |
|---|---|
| 10: | attack device |
| 20: | protective casing |
| 21: | protective material |
| 100: | body |
| 110: | wireless control unit |
| 120: | first storage part |
| 121: | discharge nozzle |
| 122: | detonator |
| 130: | camera |
| 140: | frame |
| 150: | shield cover |
| 200: | driver |
| 210: | tire |
| 300: | battery unit |

-continued

[Detailed Description of Main Elements]

| | |
|---|---|
| 310: | second storage part |
| 311: | shrapnel |
| 312: | explosive |
| 313: | detonator |
| 314: | wire |
| 320: | battery |
| 330: | battery housing |
| 400: | connector |

DESCRIPTION OF EMBODIMENTS

The advantages, features and aspects of the invention will become apparent from the following description of the embodiments with reference to the accompanying drawings, which are set forth hereinafter.

Hereinafter, the technical spirit of the present invention will be described in detail with reference to the attached drawings.

Although the attached drawings have been illustrated to explain in detail the technical spirit of the present invention, they are only one example derived from the technical spirit of the present invention. Therefore, the present invention is not limited to the embodiments illustrated in the drawings.

The present invention is related to a throwable and launchable remote-control attack device that is used for military purposes or counter-terrorism and, more particularly, to a launchable remote-control attack device that enables an operator to remotely grasp the status of a target place and to remotely control weapons that it has been equipped with so as to perform an attack using explosives or gas when necessary.

First, the outward shape of the launchable remote-control attack device in accordance with the present invention will be described with reference to FIG. 1.

The attack device 10 includes a body 100 having a camera 130, and drivers 200 made up of two tires 210 that are disposed on opposite sides of the body 100 and can be driven individually. Battery units 300 each of which is provided with a battery 320 are disposed in respective central openings of the tires 210 of the drivers 200.

Next, a first embodiment and a second embodiment of the attack device 10 of the present invention will be explained in detail with reference to FIGS. 2 through 5.

In the attack device 10, the body 100 has sufficient stiffness and functions as a main structure holding most of the electric parts. The body 100 includes a hollow frame 140 that is made of aluminum and forms a basic frame, the camera 130, and a C-shaped thin shield cover 150 that encloses a wireless control unit 110, a first storage unit 120 and the camera 130.

Furthermore, each battery unit 300 includes a battery housing 330 that has a cylindrical shape and is open on one side thereof. The battery housing 330 has a case hole in the bottom thereof into which a support shaft of the body 100 is fitted. The battery 320 and a second storage unit 310 are installed in the internal space of the battery housing 330. The entire battery housing 330 including the battery 320 and the second storage unit 310 are substantially disposed in the central opening of the tire 210.

In addition, the wireless control unit 110 is installed in the space that is the hollow internal space of the frame 140 and is enclosed by the shield cover 150. The wireless control unit 110 drives and controls the camera 130 and controls a wheel drive motor of the driver 200, the first storage unit 120 and the second storage unit 310.

The first embodiment of the launchable remote-control attack device in accordance with the present invention will be described in more detail below.

The first storage unit 120 is provided in the body 100 of the remote-control attack device 10. The second storage units 310 are provided in the respective battery units 300 which are disposed outside the body 100. The first storage unit 120 and the second storage units 310 are filled with explosive material to achieve the purposes of the attack device 10.

Each of the first and second storage units 120 and 310 includes a detonator 313, an explosive 312 and shrapnel 311. The detonator 313 is connected to the wireless control unit 110 so that the exploding of the attack device 10 can be controlled. In other words, when an operator uses a wireless controller to apply an attack command to the wireless control unit 110 of the attack device 10, an electric signal is transmitted from the wireless control unit 110 to the detonator 313 by a wire 314. Then, priming that has been in the detonator 313 explodes, thereby exploding the explosive 312. When the explosive 312 explodes, the shrapnel 311 that have been disposed in the perimeter of the explosive 312 scatters to kill and wound an enemy.

Preferably, the shrapnel 311 is provided on the outer surfaces the first storage unit 120 and the second storage units 310 so that when the explosive 312 in the first storage unit 120 와 second storage unit 310 explodes, the shrapnel 311 can be dispersed more effectively.

Figure 3:
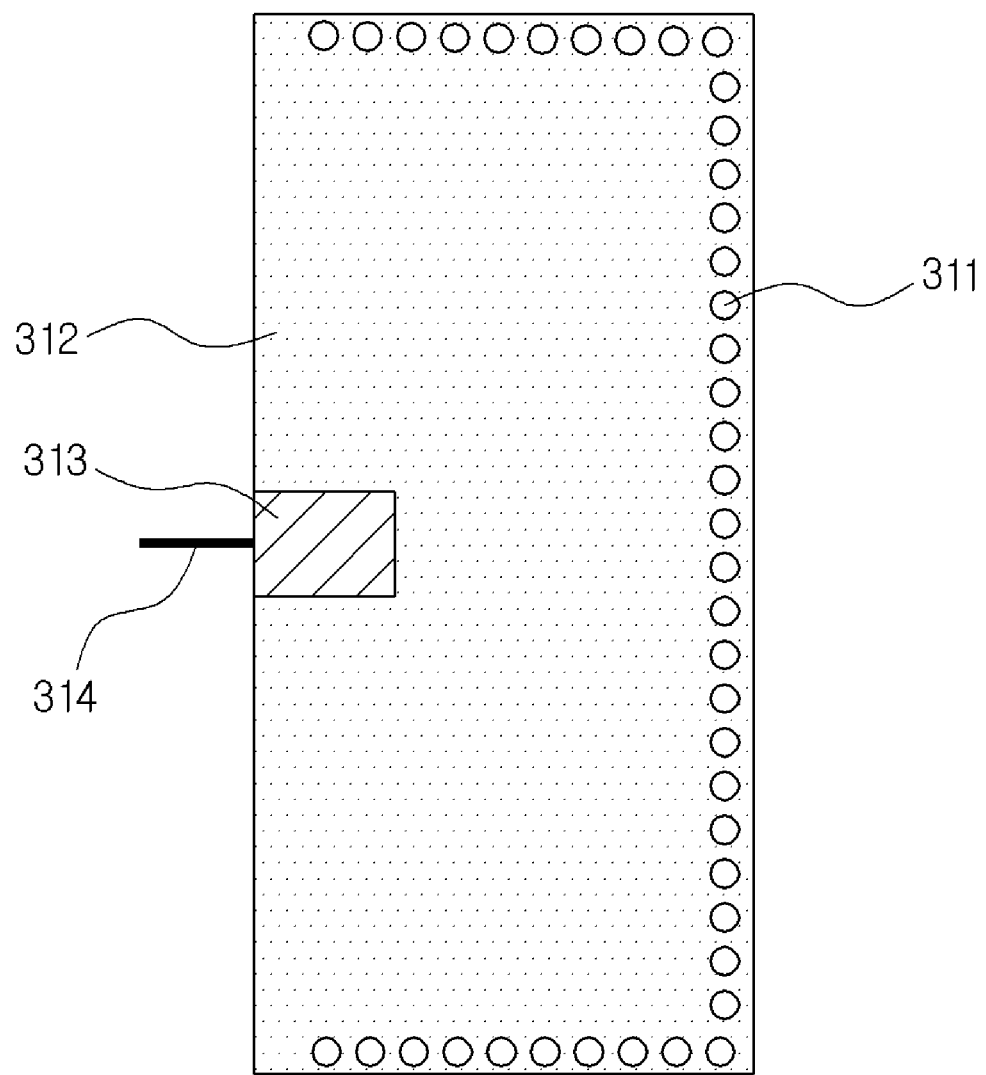
FIG. 3 is a sectional view of a storage part of a first embodiment of the remote-controller attack device in accordance with the present invention.

In detail, the first storage unit 120 has the shrapnel 311 on an upper portion thereof, and each second storage unit 310 has the shrapnel 311 on the outer surface thereof and in the perimeter thereof (refer to FIG. 3). Then, when the explosive 312 which has been in the first storage unit 120 and the second storage units 310 explodes, the shrapnel 311 can reliably scatter outwards with respect to the attack device 10, thus more effectively attacking the enemy.

The shrapnel 311 comprise a plurality of steel balls so that when there is an explosion, the steel balls scatter as a weapon with the power to kill and wound the enemy.

The second embodiment of the remote-control attack device of the present invention will be described in detail below.

The first storage unit 120 is provided in the body 100 of the remote-control attack device 10, and the second storage units 310 are provided in the respective battery units 300 which are disposed outside the body 100. In the second embodiment, the first storage unit 120 and the second storage units 310 comprise gas reservoirs to achieve the purposes of the attack device 10.

Each of the first and second storage units 120 and 310 comprises a gas storage unit that contains gas therein and is connected to the wireless control unit 110 so that the discharge of gas is controlled by the wireless control unit 110.

Figure 4A:
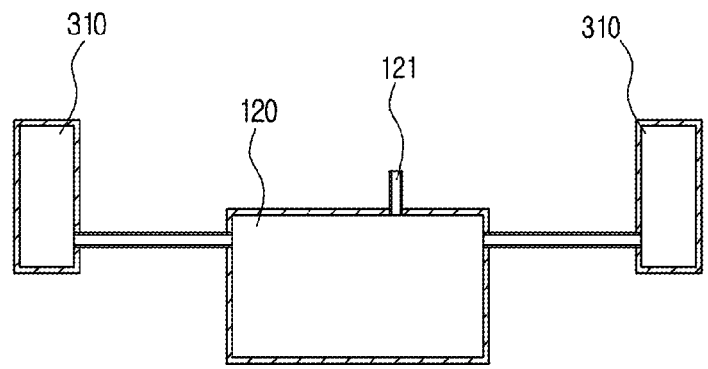
FIGS. 4A and 4B are respectively a sectional view showing a storage part of a second embodiment of the remote-controller attack device in accordance with the present invention and a partially broken perspective view of the second embodiment of the remote-control attack device.
Figure 4B:
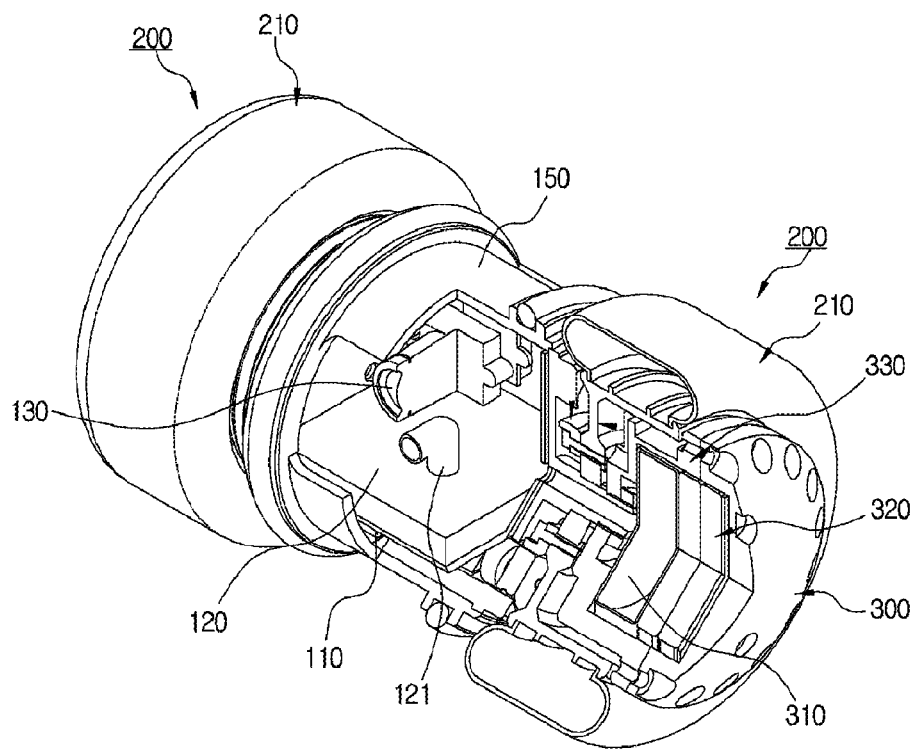

In this embodiment, a discharge nozzle 121 is provided on a side surface of the first storage unit 120, and the second storage units 310 are connected to the first storage unit 120 (refer to FIG. 4A).

When the operator uses the wireless controller to apply an attack command to the wireless control unit 110 of the attack device 10, the first storage unit 120 connected to the wireless control unit 110 opens the discharge nozzle 121 which is disposed at a position adjacent to the camera 130 (refer to FIG. 4B) so that gas is discharged out of the first storage unit 120 and the second storage units 310 through the discharge nozzle 121.

Figure 5:
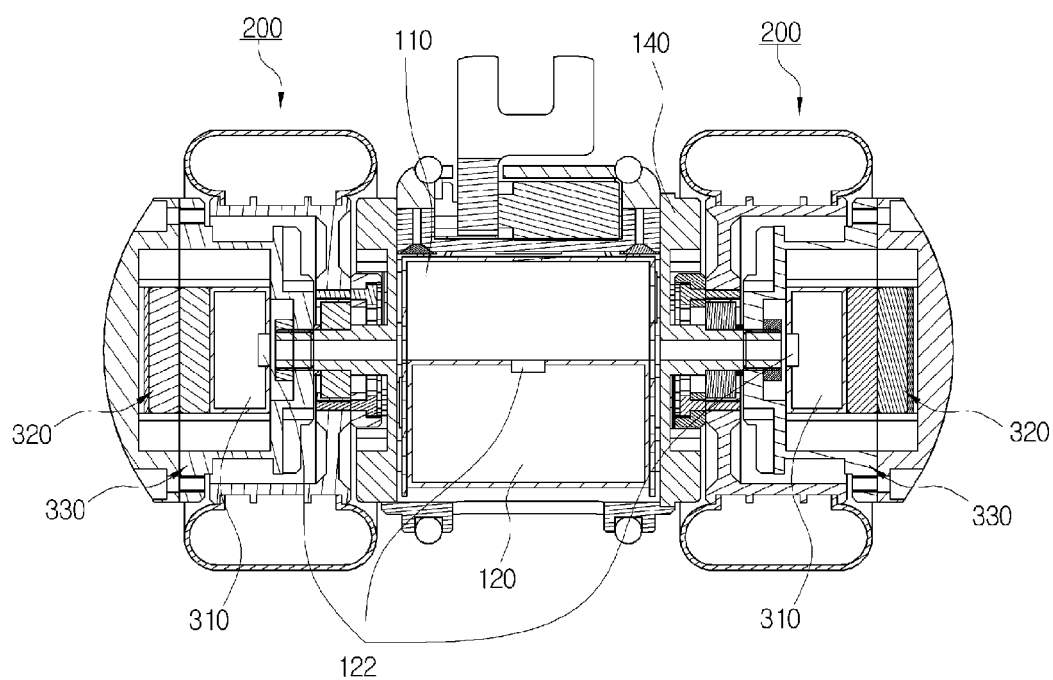
FIG. 5 is a sectional front view of the second embodiment of the remote-control attack device in accordance with the present invention.

Alternatively, the second embodiment may be configured such that detonators 122 are installed in the first storage unit 120 and the second storage units 310 and connected to the wireless control unit 110 (refer to FIG. 5). In this case, when the detonators 122 explode, the shells of the first storage unit 120 and the second storage units 310 are forcibly broken to leak out gas that has been stored therein.

Figure 6:
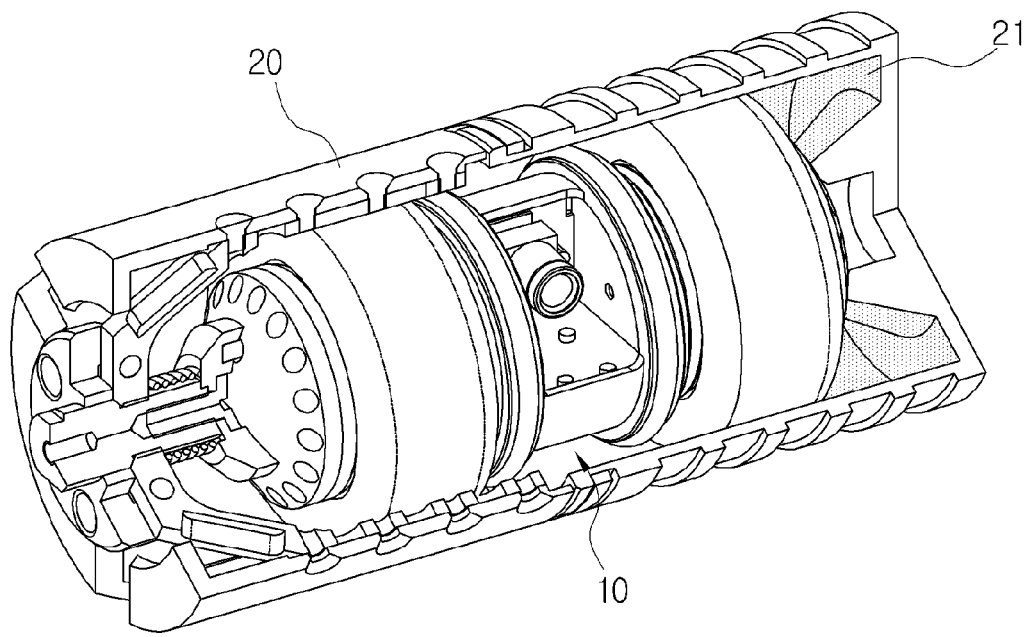
FIG. 6 is a sectional perspective view showing the remote-control attack device contained in a protective casing filled with shock absorbent made of viscoelastic material.

The use of a protective casing of the remote-control attack device in accordance with the present invention will be explained by means of an example with reference to FIG. 6.

When the attack device 10 is launched by a launcher to be rapidly thrown a long distance into a target spot during a confrontational situation, impact is applied to the attack device 10 when launched or landing. To increase resistance to such impact and thus minimize the magnitude of impact applied to the explosive material or gas in the first storage unit 120 and the second storage units 310, the attack device 10, before being launched, is preferably inserted into the protective casing 20 that is filled with protective material 21 which breaks when the device lands.

Furthermore, when the attack device 10 lands at the target spot, the protective casing 20 is broken, or after the attack device 10 has landed at the target spot, the protective casing 20 opens up. Subsequently, the attack device 10 comes out of the broken or open protective casing 20 and is operated via remote control. The operator checks the status of military operations using images transmitted from the camera 130 of the attack device 10 and remotely controls the attack device 10 to conduct attacks using explosives or gas when necessary.

Preferably, the protective casing 20 is filled with the protective material 21. The protective material 21 is made of a material having superior shock absorption ability and is manufactured in a shape corresponding to the outward shape of the attack device 10 that comes into contact with it. The protective material 21 functions to minimize the magnitude of impact applied to the attack device 10 that is in the protective casing 20 when the protective casing 20 collides with the wall of a building or the ground.

It is preferable that the protective material 21 be made of a gel type material that has a low restitution coefficient to heighten the damping effect.

A modification of the use of the remote-control attack device in accordance with the present invention will be explained with reference to FIG. 7.

Figure 7:
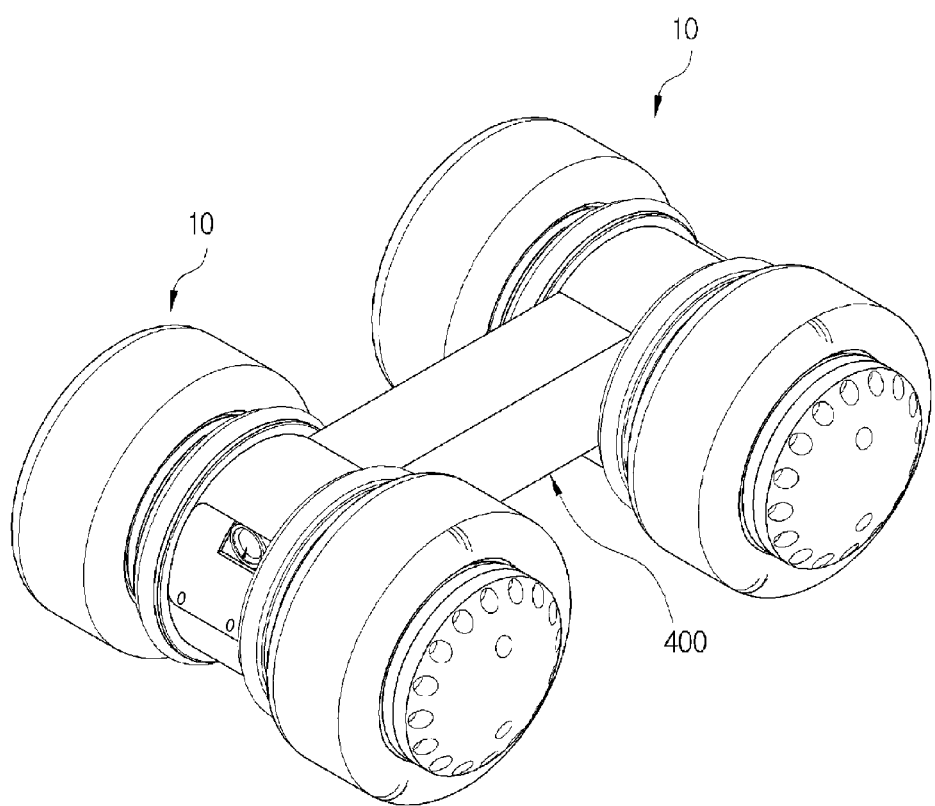
FIG. 7 is a view illustrating an application example of the remote-control attack device in accordance with the present invention.

Referring to FIG. 7, two modularized independent attack devices 10 may be connected to each other to embody an attack device having four wheels.

The two attack devices 10 can be connected together by a separate connector 400. For this, a separate coupling structure is provided on a side of the frame 140 of the body 100 of each attack device 10 so that the connector 400 is coupled to the attack device 10 by a fastening member, such as a typical bolt or the like. The general construction of the attack device 10 of FIG. 7 other than the presence of the coupling structure is the same as that of the attack device 10 of the previous embodiments. Preferably, a third storage unit is formed in the internal space of the connector 400 and filled with the same material as that of the first storage unit 120 and the second storage unit 310. In this case, the attack device can contain a larger amount of explosive or gas, to further enhance the killing ability.

As described above, in a remote-control attack device in accordance with the present invention, if the attack device is enclosed by a protective casing filled with shock absorbent, the attack device can resist a comparatively large magnitude of impact. Therefore, the attack device can be launched to a comparatively long distance and thus rapidly infiltrate into a target spot at a faraway distance.

Further, the attack device can be remotely controlled to reconnoiter a target place and conduct an attack using explosives or gas when necessary. Hence, the attack device assists successful military operations in emergency and crisis situations.

While the present invention has been described with respect to the specific embodiments, it will be apparent to those skilled in the art that various changes and modifications may be made without departing from the spirit and scope of the invention as defined in the following claims.

What is claimed is:

1. A remote-control attack device, comprising:
   a cylindrical body with a camera;
   drivers made up of two tires that are disposed on opposite sides of the body and can be driven individually;
   battery units for supplying power and disposed in central openings of the tires of the drivers;
   a plurality of storage units, the plurality of storage units including a first storage unit provided in the body and a second storage units provided in the respective battery units; and
   a wireless control unit,
   wherein each of the first and second storage units comprises a detonator, an explosive and shrapnel.

2. The remote-control attack device of claim 1, wherein the shrapnel comprises steel balls that scatter to enhance killing ability when exploding.

3. The remote-control attack device of claim 1, wherein each of the first storage unit and the second storage units comprises a gas reservoir storing gas therein.

4. The remote-control attack device of claim 3, wherein a discharge nozzle is provided on the first storage unit so that gas is discharged from the first storage unit and the second storage units through the discharge nozzle under control of the wireless control unit.

5. The remote-control attack device of claim 3, wherein each of the first storage unit and the second storage units has a detonator.

6. The remote-control attack device of claim 3, wherein the wireless control unit is connected to the first storage unit and the second storage unit to control detonation of the explosive or discharge of gas.

7. The remote-control attack device of claim 1, comprising a plurality of remote-control attack devices, wherein the cylindrical bodies of the remote-control attack devices are coupled to each other by a connector.

8. The remote-control attack device of claim 7, wherein the connector has an explosive or a gas reservoir therein.

9. The remote-control attack device of claim 1 contained in a protective casing filled with a protective material.

* * * * *